US011567751B2

(12) United States Patent
Cosentino et al.

(10) Patent No.: US 11,567,751 B2
(45) Date of Patent: Jan. 31, 2023

(54) PROVIDING SYSTEM UPDATES IN AUTOMOTIVE CONTEXTS

(71) Applicant: Red Hat, Inc., Raleigh, NC (US)

(72) Inventors: Andrea Cosentino, Milan (IT); Paolo Antinori, Milan (IT)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/343,253

(22) Filed: Jun. 9, 2021

(65) Prior Publication Data
US 2022/0398083 A1    Dec. 15, 2022

(51) Int. Cl.
| G06F 9/44 | (2018.01) |
| G06F 15/173 | (2006.01) |
| G06F 8/65 | (2018.01) |
| G06F 8/77 | (2018.01) |
| G06F 11/34 | (2006.01) |
| G06F 11/30 | (2006.01) |
| G06F 8/71 | (2018.01) |

(52) U.S. Cl.
CPC ............... *G06F 8/65* (2013.01); *G06F 8/71* (2013.01); *G06F 8/77* (2013.01); *G06F 11/3055* (2013.01); *G06F 11/3409* (2013.01)

(58) Field of Classification Search
CPC ..... G06F 8/65; G06F 8/71; G06F 8/77; G06F 11/3055; G06F 11/3409
See application file for complete search history.

(56) References Cited

U.S. PATENT DOCUMENTS

| 7,707,573 B1* | 4/2010 | Marmaros | H04L 67/34 |
| | | | 717/121 |
| 9,715,378 B2 | 7/2017 | Dickerson et al. | |
| 2011/0307882 A1 | 12/2011 | Shiba | |
| 2016/0294614 A1* | 10/2016 | Searle | G06F 8/65 |
| 2021/0390182 A1* | 12/2021 | Boutnaru | G06F 8/433 |

* cited by examiner

Primary Examiner — Lewis A Bullock, Jr.
Assistant Examiner — Mohammad H Kabir
(74) Attorney, Agent, or Firm — K&L Gates LLP (57) ABSTRACT

A system includes a memory, a processor in communication with the memory, and an automotive operating system (OS) with a software update manager for an automobile. The system is configured to determine a new software update is available, monitor operating metrics of the automotive OS, and determine an installation time-window when each of the operating metrics collectively fall within respective predetermined thresholds. Responsive to determining that each of the operating metrics fall within respective predetermined thresholds, the system is configured to signal to the software update manager to start the installation once the automobile meets installation criteria. The installation criteria include at least (i) a first criteria that the automobile is stationary and (ii) a second criteria that the automotive OS is in an available state.

17 Claims, 8 Drawing Sheets

PROVIDING SYSTEM UPDATES IN AUTOMOTIVE CONTEXTS

BACKGROUND

Software updates are becoming more common in the automotive industry. In some instances, to update a software version of a component of a vehicle or the automotive operating system, the vehicle may be serviced at a dealership to apply the software update. For example, a technician may manually apply the software updates indicated by the system and record any changes back into the system. However, software patches and other updates are now being provided over-the-air. Typically, the software updates or patches may be provided for better performance, more efficient performance, improved features, etc. Specifically, the original software provided with the vehicle may require updates over time to correct identified defects, to improve performance, and to add additional desirable features.

Software may be upgraded by replacing the software entirely (e.g., replacing the existing software version with an entirely new version). Alternatively, smaller updates such as software patches or making incremental changes to the underlying software may be used to upgrade an automotive operating system.

SUMMARY

The present disclosure provides new and innovative systems and methods for providing system updates in automotive contexts. Specifically, the present disclosure provides techniques for identifying safe time windows for system updates in automotive contexts, for example by leveraging Berkeley Packet Filter ("BPF") technology. In an example, a system includes a memory, a processor in communication with the memory, and an automotive operating system (OS) with a software update manager for an automobile. At least one of the processor, the automotive OS and the software update manager is configured to determine a new software update is available, monitor operating metrics of the automotive OS, and determine an installation time-window when each of the operating metrics collectively fall within respective predetermined thresholds. Responsive to determining that each of the operating metrics fall within respective predetermined thresholds, the at least one of the processor, the automotive OS and the software update manager is configured to signal to the software update manager to start the installation once the automobile meets installation criteria. The installation criteria include at least (i) a first criteria that the automobile is stationary and (ii) a second criteria that the automotive OS is in an available state.

In an example, a method includes determining that a new software update is available for an automobile, monitoring operating metrics of an automotive OS of the automobile, and determining an installation time-window when each of the operating metrics collectively fall within respective predetermined thresholds. Responsive to determining that each of the operating metrics fall within respective predetermined thresholds, the method includes signaling to a software update manager of the automotive OS to start installing the new software update once the automobile meets installation criteria. The installation criteria include at least (i) a first criteria that the automobile is stationary and (ii) a second criteria that the automotive OS is in an available state.

In an example, a system includes a memory, a processor in communication with the memory, an automotive operating system (OS) with a software update manager for an automobile, and a Berkley Packet Filter (BPF) tool associated with the automotive OS. The BPF tool is configured to responsive to receiving a new software update, monitor at least a first operating metric and a second operating metric of the automotive OS. The BPF tool is also configured to identify a potential installation time-window for the new software update based on at least the first operating metric and the second operating metric. Additionally the BPF tool is configured to initiate an installation of the new software update during the potential installation time-window.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Techniques are disclosed for identifying safe time windows for system updates in automotive contexts. Specifically, the present disclosure describes using BPF-based approaches for identifying appropriate time windows or time slots when automotive system updates may be safely installed. In the automotive industry, software upgrades and patches are typically performed while the vehicle (e.g., car) is powered off. For example, software upgrades and patches may be applied while the vehicle is powered off to ensure connection stability and reduce error rates. However, requiring the vehicle to be powered off limits when updates can be made to a vehicle, which may result in delays for applying the update. In some instances, delaying the updates, which may be critical software upgrades or patches, may increase risks to drivers and passengers. For example, software bugs may continue to exist in a vehicles computer given the inconvenience and limited time frame for applying such upgrades.

Berkeley Packet Filter (BPF) is a technology used in computers and operating systems for analyzing network traffic and filtering network traffic. For example, BPF tools may provide an interface to data link layers, permitting raw link-layer packets to be sent and received. BPF also supports filtering packets, allowing processes to supply a filter program that specifies which packets can be received. For example, a "tcpdump" process may prefer to receive only packets that initiate a TCP connection. By utilizing BPF, the BPF technology may advantageously return only packets that pass the filter (e.g., packets that initiate a TCP connection) that the process (e.g., "tcpdump" process) supplies. In doing so, the BPF advantageously avoids copying unwanted packets from the operating system kernel to the process, thereby advantageously improving performance. In some instances, BPF's filtering capabilities may be implemented as an interpreter for a machine language for BPF virtual machines. BPF tools allow programs to fetch data from packets, perform arithmetic operations on the data, and compare any results against constants, predetermined thresholds, or other data in the packet. Additionally, BPF tools allow packets to be accepted or rejected based on the results of any tests or operations performed by the BPF tools.

As noted above, BPF tools may be used to observe operating systems and allows users to run small pieces of code quickly and safely inside the operating system. For example, with BPF technology, developers may write small BPF programs that can monitor data, record data, and determine a system's state (e.g., system in the idle state or system under heavy load). Unlike other software update mechanisms, the BPF tools advantageously may perform updates by running pieces of code safely inside the operating system without writing new kernel modules. For example, many traditional software update mechanisms typically write and install new kernel modules, which may cause the automotive operating system (OS) to crash or enter kernel panic. For example, kernel panic is a safety measure taken by an OS's kernel upon detecting an internal fatal error in which the kernel is unable to safely recover from or where continuing to run the system may have higher risks of major data loss. By applying software updates and patches according to the techniques disclosed herein, updates can be applied throughout the day to reduce the risks associated with delaying software updates. Furthermore, the software updates are applied in a manner that advantageously avoids writing new kernel modules and thus prevents kernel crashes or kernel panic.

Some of the network traffic analysis and filtering performed by BPF technology in automotive contexts may be to monitor the load (e.g., CPU load) of the computer and electronics system of an automobile. For example, the computer system may observe and monitor various automotive measurements and data (e.g., CPU load, CPU idle time, etc.). By leveraging BPF technology to observe and monitor various automotive measurements and data, and based on the measurements and data, determine an appropriate time window for installing software updates, software upgrades can be applied during the time window to ensure safety and reduce installation errors.

The present disclosure is especially advantageous to automotive manufacturers, especially those specializing in electric vehicles that want to improve software upgrade procedures. For example, by implementing the systems, methods and techniques disclosed herein, automotive manufacturers may provide over-the-air software updates and patches safely, in broader time-windows, without negatively affecting the kernel.

Figure 1:
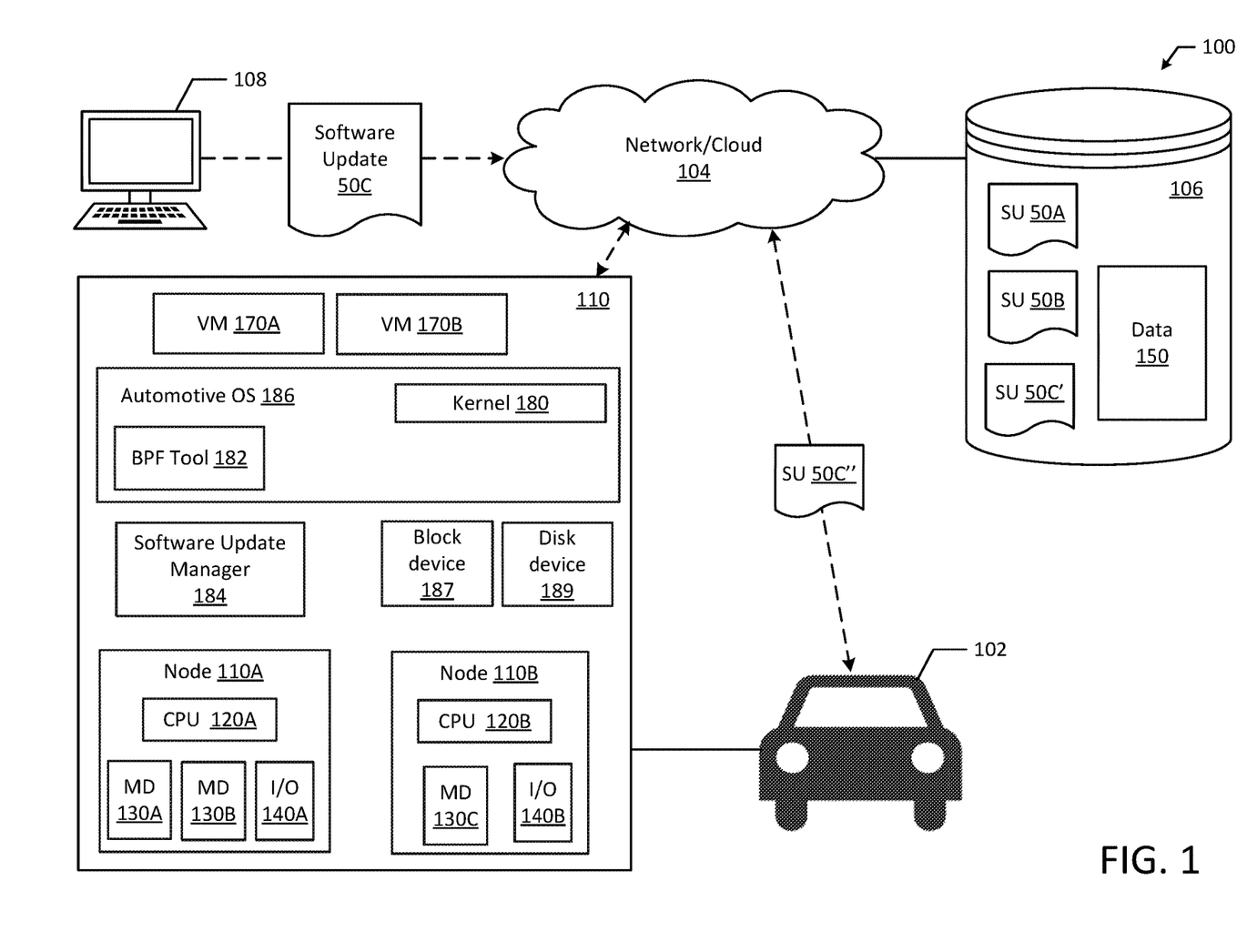
FIG. 1 illustrates a block diagram of an example automotive software upgrade network system according to an example embodiment of the present disclosure.

FIG. 1 depicts a high-level component diagram of an example automotive software upgrade network system 100 in accordance with one or more aspects of the present disclosure. The system 100 may include an automobile 102, its corresponding automotive OS 186 and any supporting hardware. For example, the system may include a computer system 110 with a memory (e.g., MDs 130A-C), a processor (e.g., CPU 120A-B) in communication with the memory (e.g., MDs 130A-C). The automotive operating system (OS) 186 may include a software update manager 184 and a Berekely Packet Filter ("BPF") tool 182. In the illustrated example, the BPF tool 182 is an integrated tool of the automotive OS 186 (e.g., is part of the OS 186). However, in other examples, the BPF tool 182 may be separate from the automotive OS 186.

As illustrated in FIG. 1, a developer may create and package a software update (e.g., software update 50C) from a workstation 108 and send the software update (e.g., software update 50C) to the network/cloud 104. The software update(s) 50A-C may be stored in a database 106. As illustrated in FIG. 1, software update 50C is illustrated as software update 50C' once stored in the database 106. The database 106 may also store other data 150 associated with either the automobile 102, such as which software updates apply to which car models, etc. Additionally, the software updates (e.g., software update 50C) may be pulled from the network/cloud 104 to be installed to update the automotive OS 186. As depicted in FIG. 1, the software update 50C is illustrated as software update 50C" as it is pulled or sent to the automobile 102.

The automotive OS 186 and its associated hardware may run applications or programs in virtualized environments, such as virtual machines 170A-B. Additionally, the automotive OS 186 may be associated with a kernel 180. The computer system 110 may include hardware, such as block device(s) 187, disk device(s) 189 and one or more nodes 110A-B.

Each node 110A-B may in turn include one or more physical processors (e.g., CPU 120A-B) communicatively coupled to memory devices (e.g., MD 130A-C) and input/output devices (e.g., I/O 140A-B). Each node 110A-B may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. VMs 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

As used herein, physical processor, processor or CPU 120A-B, refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 140A-B refers to a device capable of providing an interface between one or more processor pins and an external device capable of inputting and/or outputting binary data.

Processors (e.g., CPUs 120A-B) may be interconnected using a variety of techniques, ranging from a point-to-point processor interconnect, to a system area network, such as an Ethernet-based network. Local connections within each node, including the connections between a processor (e.g., CPU 120A-B) and a memory device 130A-C, may be provided by one or more local buses of suitable architecture, for example, peripheral component interconnect (PCI).

Figure 2:
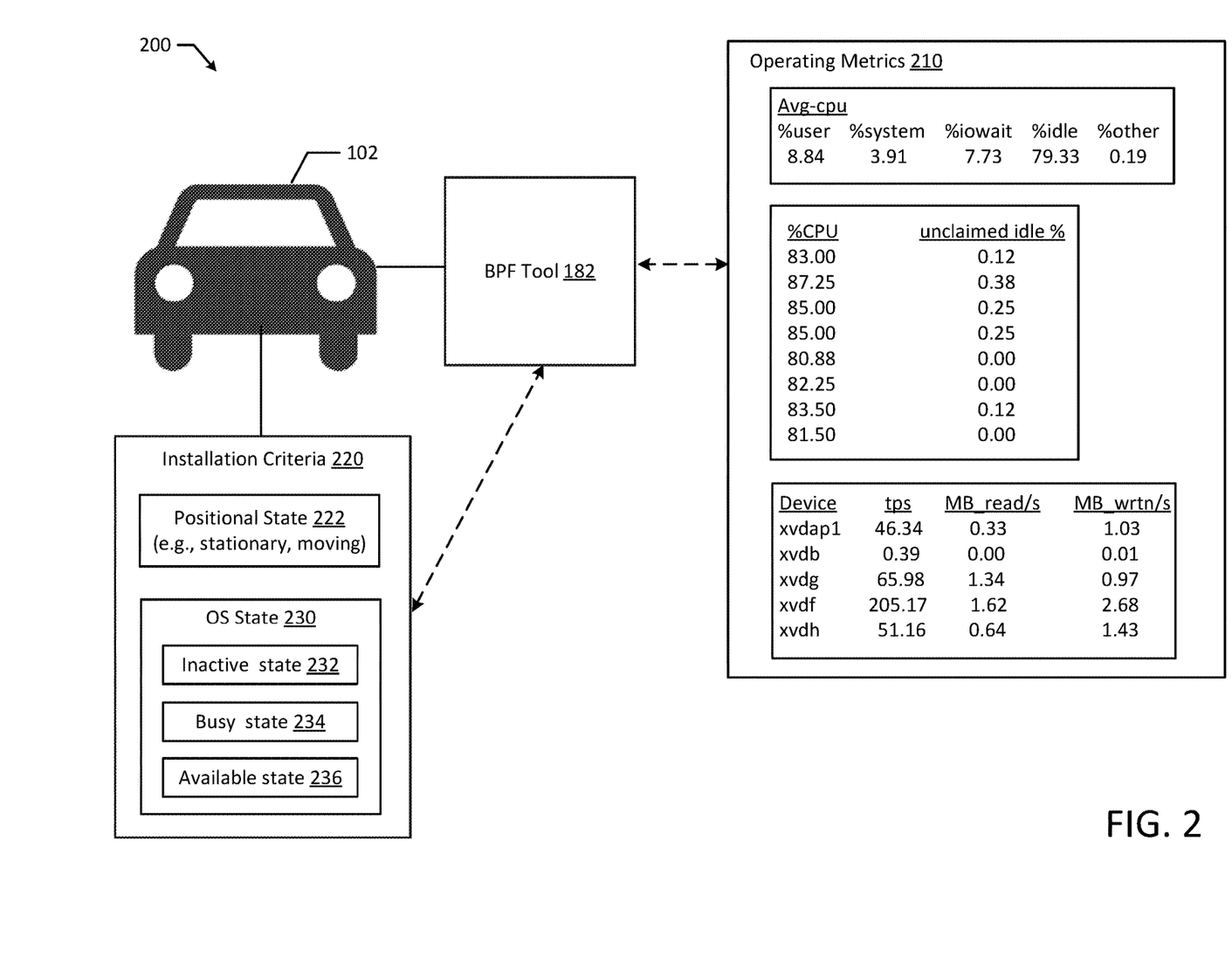
FIG. 2 illustrates a block diagram of an example automotive update system according to an example embodiment of the present disclosure.

FIG. 2 illustrates a block diagram of an automotive update system 200 for identifying safe time windows for applying system updates using a BPF tool 182. As illustrated in FIG. 2, the BPF tool 182 may monitor and analyze various operating metrics 210 and installation criteria 220.

The operating metrics 210 may include various CPU metrics, system metrics, and other metrics associated with the supporting hardware of the automobiles computer system. For example, the BPF tool 182 may monitor and analyze operating metrics 210 to determine average CPU metrics such as average CPU such as "% user", "% system", "% iowait", "% idle" and "% other". The average CPU usage by a user (e.g., % user) may indicate the average amount of CPU capacity utilized by a user (e.g., driver and specific driver activities like interacting with the entertainment system). The average CPU usage by the system (e.g., % system) may indicate the average amount of CPU capacity utilized by the automotive control system, for example, sending instructions regarding timing, ignition, etc. The average CPU usage dedicated to waiting for I/O operations (e.g., % iowait) may indicate the average amount of CPU capacity dedicated to waiting for I/O operations. One of the most relevant metrics may be the average amount of CPU that is sitting idle (e.g., % idle), which may indicate on average how much free capacity the CPU has to perform other tasks, such as software upgrades or patches. Other operating metrics may also be tracked, such as the average CPU usage dedicated to other specified activities (e.g., % other).

In addition analyzing metrics to determine average CPU metrics, operating metrics 210 may be monitored and tracked in real-time. For example, the BPF tool 182 may monitor and record instantaneous CPU usage (e.g., 83.00%) for one or more system processes and unclaimed idle percentages (e.g., 0.12%) at a predetermined sampling interval. For example, the CPU usage (e.g., 83.00%) may be the CPU usage of the software update manager 184. The unclaimed idle percentage may be an average percentage over the sampling interval. For example, if the sampling interval is 10 seconds, the unclaimed idle percentage may be the average amount over the sampling interval. In an example, the CPU usage data (e.g., percent used and percent idle) may be recorded every 2 seconds, 5 seconds, etc. The predetermined sampling interval may be anywhere from a few milliseconds to upwards of tens of seconds.

The BPF tool 182 may also monitor and record transactional data for various devices (e.g., block device(s) 187 and disk device(s) 189 of FIG. 1) associated with the automotive operating system 186. For example, the transfers per second ("tps"), data read per second (e.g., MB_read/s) and data written per second (e.g., MB_wrtn/s) may be recorded for various devices "xvdap1", "xvdg", "xvdg", etc. which may be block device(s) 187 or disk device(s) 189. The transfer, read and write data may indicate how much the supporting hardware is being used and may indicate times of high activity or high load.

The installation criteria 220 may include a positional state 222 and an OS state 230. The OS state 230 may be one of an inactive state 232, a busy state 234 or an available state 236. The inactive state 232 may indicate that the automobile 102 is powered down. For example, when the engine is powered off and the automobile 102 is in park, the automobile may be considered to be in the inactive state 232. The busy state 234 may indicate that the automotive OS 186 is busy performing an update or other task thereby making the automotive OS 186 unavailable for performing a new software update. For example, in the busy stat 234, the automotive OS 186 may be occupied with processing and executing instructions for a user (e.g., navigational system instructions) or executing instructions for driving related activities (e.g., engine timing, fuel injection, activating turn signals, etc.). The available state 263 may indicate that the automotive OS 186 has sufficient computational resources to perform the new software update (e.g., software update 50C" from FIG. 1). Additionally, the positional state 222 may indicate whether the automobile 102 is stationary or moving.

The software update(s) may be provided as small bits of code, such as BPF code. The code may be bytecode, and the bytecode may be WebAssembly ("WASM") bytecode or Berekely Packet Filter ("BPF") bytecode. In other examples, the code may be provided as native code such as native client ("NaCl") code. In an example, the BPF tool may include an integrated interpreter for interpreting, executing and running the small bits of code that are injected into the automotive OS 186. Through the interpreter, the BPF tool 182 may install the software updates safely and securely without affecting the kernel 180.

As illustrated in FIG. 2, the BPF tool 182 may be leveraged to determine the best time-window to install small automotive software updates without requiring the automobile 102 to be turned off (e.g., powered down). For example, when the automobile 102 is in motion, a new software update (e.g., SU 50C') may be made available in the network/cloud 104. For example, referring back to FIG. 1, the software update (e.g., SU 50C') may be stored in database 106 and may be accessible through the network/cloud 104. Once the automotive OS 186 is aware of the software update (e.g., SU 50C'), the BPF tool 182 may start monitoring and analyzing various metrics and installation criteria.

For example, the BPF tool 182 may execute a BPF function that samples CPU run queues and calculates unclaimed idle CPU. The BPF function may also obtain memory measurements, such as memory leak or memory pressure to determine performance characteristics of the automotive OS 186 and the underlying hardware. The BPF function may also check basic disk metrics, such as request times, input/output operations per second ("IOPS"), disk utilization (e.g., iostat(1)) for the automotive OS 186 and the underlying hardware. Each of the (i) unclaimed CPU, (ii)

memory measurements and (iii) disk metrics may have an associated threshold. For example, the installation time-window may be a time when each of the (i) unclaimed CPU, (ii) memory measurements and (iii) disk metrics fall within acceptable ranges or below respective threshold levels. In some examples, the installation time-window may be identified after the (i) unclaimed CPU, (ii) memory measurements and (iii) disk metrics are within acceptable ranges for a specified time, such that the metrics are within the acceptable ranges after reaching a steady state. Monitoring metrics and ensuring the metrics fall within the acceptable ranges for a specified time provides more confidence that the entire patch or update can be completed in the installation time-window.

In an example, the unclaimed CPU may have an associated threshold requiring at least half of the CPUs (e.g., CPU 120A and CPU 120B) to have at least 20% of their CPU capacity being unclaimed and idle. In the example illustrated in FIG. 2, the operating metrics 210 indicate that the system is under heavy CPU load with CPU utilization above 80% and very little unclaimed idle CPU. Additionally, the memory measurement metrics may have an associated threshold requiring at least 30 percent free memory of the available memory. For example, the BPF tool 182 may monitor available memory from memory devices 130A-C. The disk metrics may have an associated threshold requiring less than 200 operations per second or tps. Therefore, in the illustrated example, the installation time-window may be identified as a window of time where at least half of the CPUs (e.g., CPU 120A-B) have at least 20% of their CPU capacity being unclaimed and idle, at least 30% of the available memory to the system being free, and where the disk metrics indicate that there are less than 200 operations per second being performed.

Once the BPF tool 182 determines that each of the operating metrics 210 are within the prescribed and acceptable ranges, the BPF tool 182 may signal to the software update manager 184 that installation of the software update can begin. Then, the software update manager 184 may start installing the software update within the installation time-window. In an example, the software update manager 184 may confirm various installation criteria prior to starting the installation process. For example, in some instances, the automobile 102 may be required to be stationary to provide additional safety to any passengers in the automobile 102. Additionally, the software update manager 184 may also confirm that the automotive OS 186 is in an appropriate state (e.g., available state 236) to perform the update.

Figure 3:
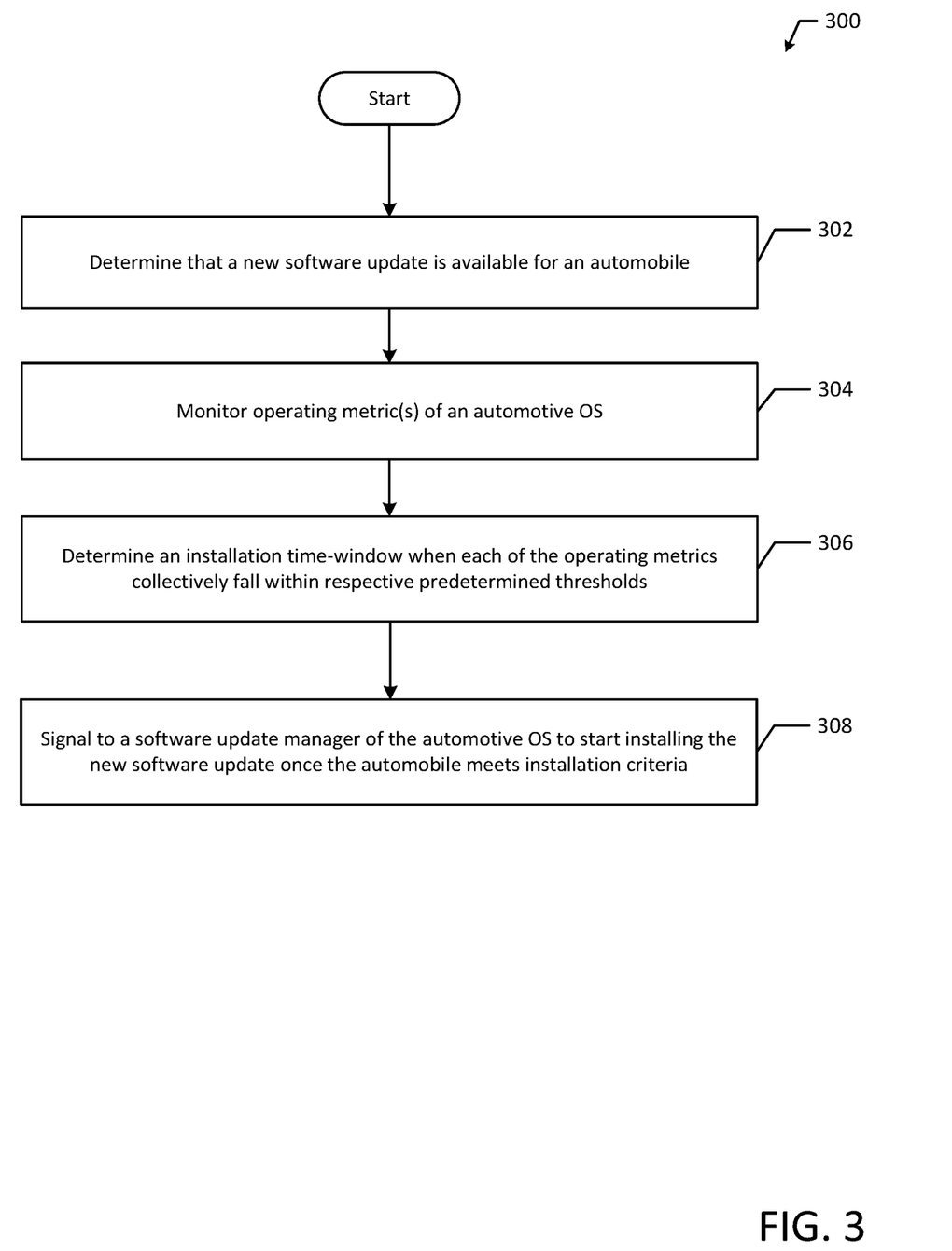
FIG. 3 illustrates a flowchart of an example process for identifying an installation time-window for performing new software updates for an automobile according to an example embodiment of the present disclosure.

FIG. 3 illustrates a flowchart of an example method 300 for identifying an installation time-window for performing new software updates for an automobile in accordance with an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated, and some of the blocks described are optional. The method 300 may be performed by processing logic that may comprise hardware (circuitry, dedicated logic, etc.), software, or a combination of both.

In the illustrated example, method 300 includes determining that a new software update is available for an automobile (block 302). For example, an automotive OS 186, a software update manager 184 or the supporting hardware (e.g., processor 120) may determine that a new software update (e.g., SU 50C") is available for an automobile 102. Other tools associated with the automotive OS 186, such as BPF tool 182, may also be responsible for determining that the new software update (e.g., SU 50C") is available. Method 300 also includes monitoring operating metric(s) of an automotive OS (block 304). For example, the automotive OS 186, the software update manager 184 or the BPF tool 182 may monitor operating metrics 210 of the automotive OS 186 of the automobile 182. As described above, the BPF tool 182 is specifically adapted to monitor network activity and data akin to the operating metrics 210 of the automotive OS 186.

Then, method 300 includes determining an installation time-window when each of the operating metrics collectively falls within respective predetermined thresholds (block 306). For example, the automotive OS 186, the software update manager 184 or the BPF tool 182 may determine an installation time-window when each of the operating metrics 210 collectively all within respective predetermined thresholds. Specifically, the BPF tool 182 may determine or identify the installation time-window when the automobile OS 186 is below 25% CPU usage and when the disk device 189 is below a specified read/write threshold (e.g., less than 0.05 MB_read/s and less than 0.05 MB_wrtn/s).

Method 300 also includes signaling to a software update manager of the automotive OS to start installing the new software update once the automobile meets installation criteria (block 308). For example, responsive to determining that each of the operating metrics 210 fall within respective predetermine thresholds, the automotive OS 186 or more specifically the BPF tool 182 may signal to the software update manager 184 to start the installation once the automobile 102 meets certain installation criteria 220. As noted above, the BPF tool 182 may be an integrated tool or component of the automotive OS 186. The installation criteria 220 may include a first criteria regarding the positional state 222 of the automobile 102, specifically that the automobile 102 is stationary (e.g., in park). The installation criteria 220 may also include a second criteria that the automotive OS 186 is in an available state 236.

Figure 4:
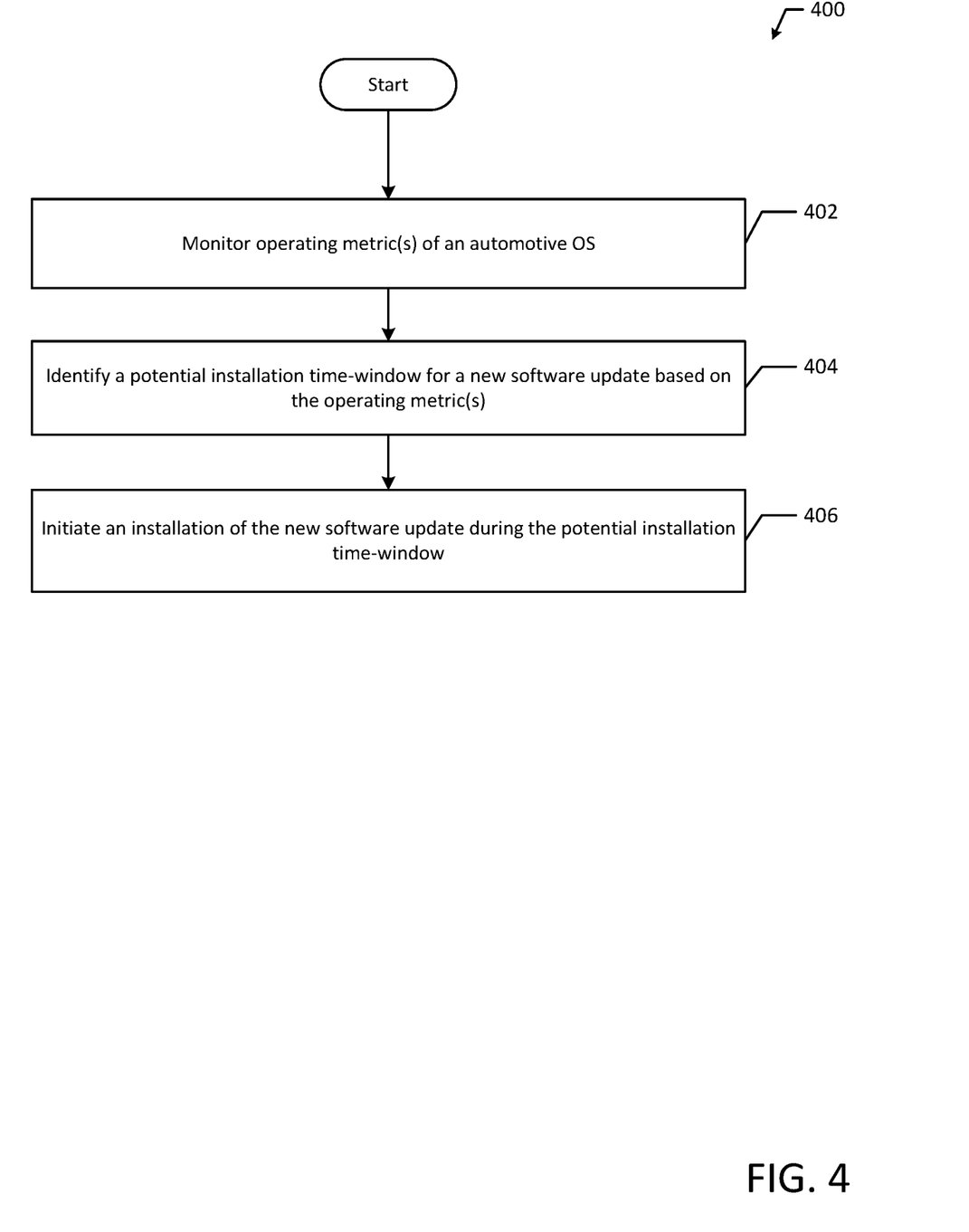
FIG. 4 illustrates a flowchart of an example process for identifying a potential installation time-window for performing new software updates for an automobile according to an example embodiment of the present disclosure.

FIG. 4 illustrates a flowchart of an example method 400 for identifying a potential installation time-window for performing new software updates for an automobile in accordance with an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, blocks may be repeated, and some of the blocks described are optional. The method 400 may be performed by processing logic that may comprise hardware (circuitry, dedicated logic, etc.), software, or a combination of both.

In the illustrated example, method 400 includes monitoring operating metric(s) of an automotive OS (block 402). For example, responsive to receiving a new software update (e.g., SU 50C"), a BPF tool 182 may monitor at least a first operating metric 210 (e.g., an unclaimed CPU metric) and a second operating metric 210 (e.g., a disk metric). The operating metric(s) 210 may also include a memory pressure metric, a memory leak metric, etc. The disk metric may be a request time metric, an input/output operation per second ("IOPS") metric, or a disk utilization metric.

Method 400 also includes identifying a potential installation time-window for a new software update based on the operating metric(s) (block 404). For example, the BPF tool 182 may identify a potential installation time-window for the new software upgrade (e.g., SU 50C") based on at least the first operating metric 210 (e.g., an unclaimed CPU metric) and the second operating metric 210 (e.g., a disk metric).

Additionally, method 400 includes initiating an installation of the new software update during the potential installation time-window (block 406). For example, the BPF tool 182 may initiate an installation of the new software update (e.g., SU 50C") during the potential installation time-window. In an example, the BPF tool 182 may initiate the installation by sending an instruction to the software update manager 184. The new software update (e.g., SU 50C") may be installed without writing new kernel modules, which advantageously prevents the risks associated with writing and installing new kernel modules (e.g., system crashes or kernel panic). For example, the software update (e.g., SU 50C") may be installed by injected pieces of BPF code through an interpreter, which can be safely run without affecting the kernel.

Figure 5A:
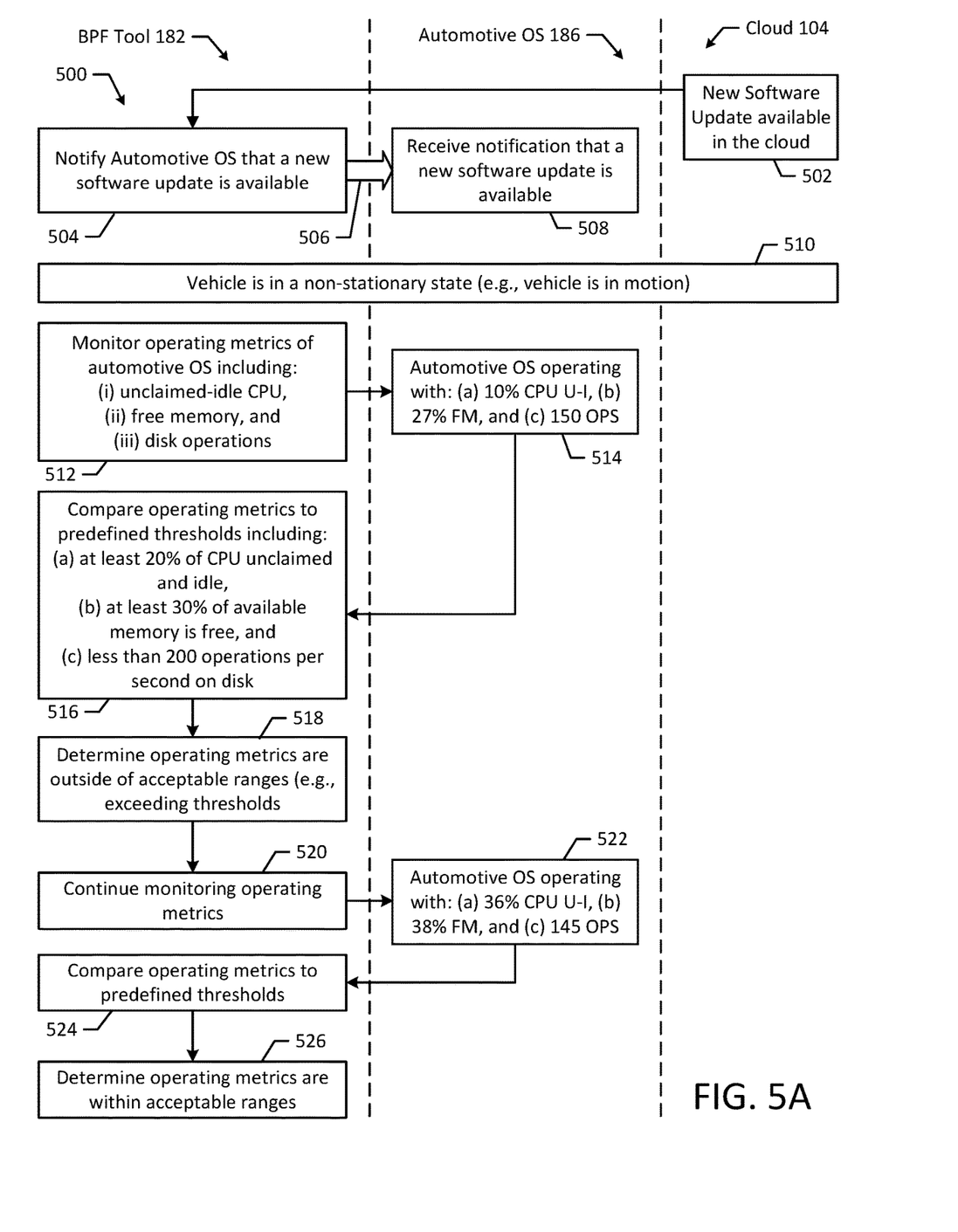
FIGS. 5A and 5B illustrate a flow diagram of an example process for identifying an installation time-window and performing a new software update for an automobile according to an example embodiment of the present disclosure.
Figure 5B:
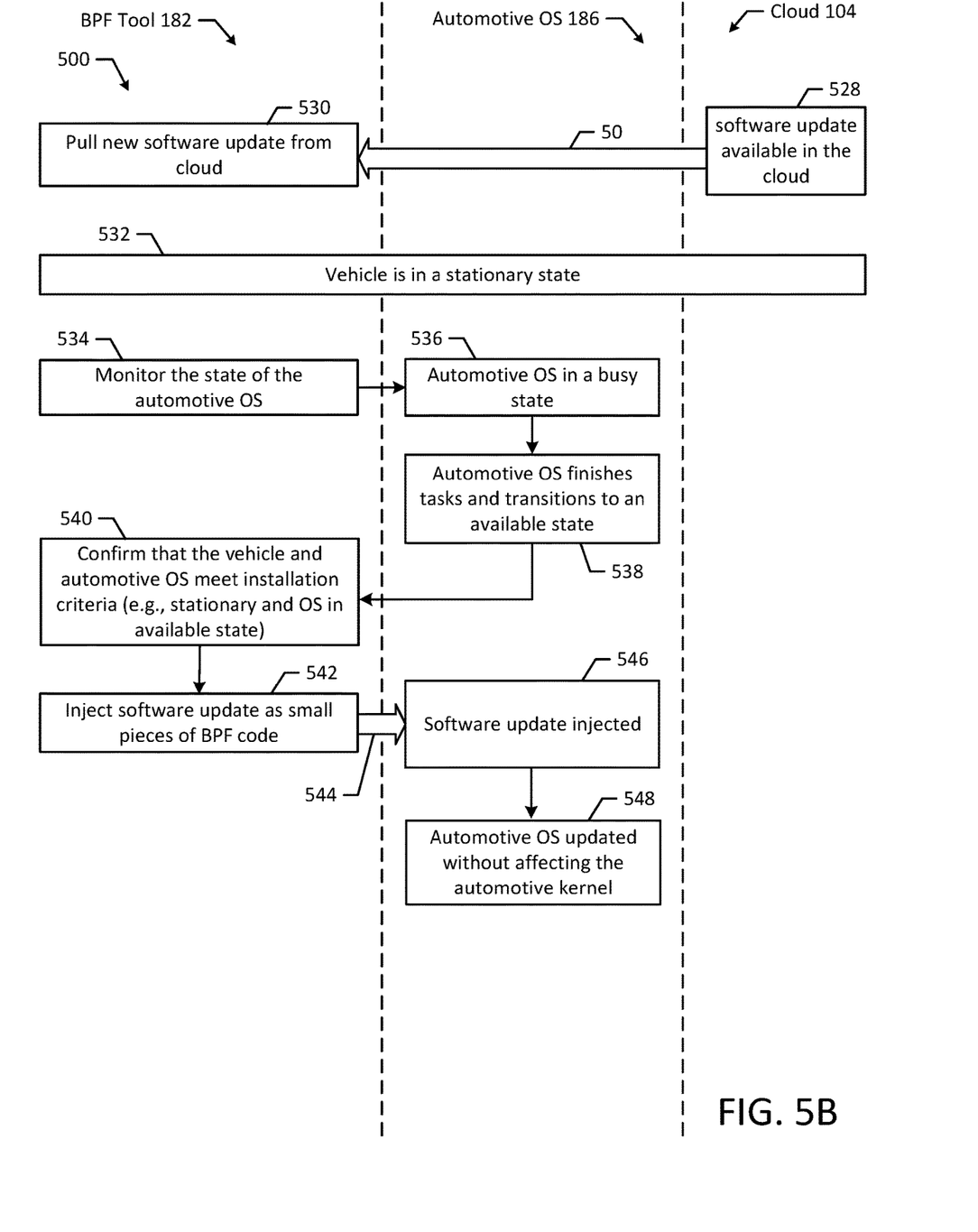

FIGS. 5A and 5B depicts a flow diagram illustrating an example method 500 for performing a software update for an automotive OS safely without affecting the kernel according to an example embodiment of the present disclosure. Although the example method 500 is described with reference to the flow diagram illustrated in FIGS. 5A and 5B, it will be appreciated that many other methods of performing the acts associated with the method may be used. For example, the order of some of the blocks may be changed, certain blocks may be combined with other blocks, blocks may be repeated, and some of the blocks described are optional. The method may be performed by processing logic that may comprise (e.g., circuitry, dedicated logic, etc.), software, or a combination of both. For example, a BPF tool 182 may communicate with an automotive OS 186 and may communicate over a network with a cloud 104 hosting software updates to perform example method 500.

In the illustrated example, a new software update (e.g., software update 50) is available in the cloud 104 (block 502). Once the new software update 50 is detected, the BPF tool 182 may notify the automotive OS 186 of the new software update 50 is available (block 504). For example, the BPF tool 182 may send a notification 506 to the automotive OS 186. Then, the automotive OS 186 may receive the notification 506 that the new software update 50 is available (block 508). In other examples, the cloud 104 may push a notification to either the BPF tool 182 or the automotive OS 186. Alternatively, the BPF tool 182, the automotive OS 186 or some other communication module may regularly poll the cloud 104 to determine when new updates are available, which can be applied as over-the-air.

At a later time, the vehicle may start moving such that the vehicle 102 is in a non-stationary state (e.g., vehicle is in motion) (block 510). Then, the BPF tool 182 may monitor various operating metrics 210 of the automotive OS 186 (block 512). For example, the operating metrics 210 that the BPF tool 182 monitors may include (i) percentage of unclaimed-idle CPU, (ii) percentage of free memory (of the available memory), and (iii) disk operations (e.g., operations per second). In the illustrated example, the automotive OS operates with (a) 10% of the CPU being unclaimed and idle (10% CPU U-I), (b) 27% of the available memory being free (27% FM), and (c) the disk performing 150 operations per second (OPS) (block 514).

The BPF tool 182 may also compare the operating metrics 210 to predefined thresholds (block 516). For example, the predefined thresholds may include a threshold for the unclaimed-idle CPU (e.g., at least 20% of the CPU being unclaimed and idle), a threshold level of available memory (e.g., at least 30% of available memory is free), and a threshold quantity of operations (e.g., less than 200 operations per second on disk). The thresholds provided in FIG. 4A are for illustrative purposes only, it should be appreciated that other threshold levels may be used and other metrics may be monitored. Based on the current operating metrics 210, the BPF tool 182 determines that the operating metrics are outside of the prescribed acceptable ranges (block 518). For example, only 10% of the CPU is unclaimed and idle which is below the prescribed threshold of at least 20% of the CPU is unclaimed and idle. Additionally, only 27% of the available memory is free, which is below the threshold of at least 30% of the available memory is free.

The BPF tool 182 may continue to monitor operating metrics until the operating metrics fall within the prescribed thresholds (block 520). In the illustrated example, the automotive OS 186 is now operating with 36% of the CPU unclaimed and idle, 38% of the available memory being free, and with the disk performing 145 OPS (block 522). Again the BPF tool 182 may compare the operating metrics 210 predefined thresholds (block 524). In the illustrated example, the BPF tool 182 determines that the operating metrics 210 are within acceptable ranges (block 526). While the operating metrics 210 are within acceptable ranges, the BPF tool 182 may identify a potential installation time-window for the software update 50.

Continuing on FIG. 5B, the software update 50 is available in the cloud (block 528) and the BPF tool 182 may pull the software update 50 from the cloud 104 (block 530). Alternatively, the BPF tool 182 may pull the software update 50 from the cloud 104 as soon as the software update 50 becomes available. However, in the illustrated example, the BPF tool 182 pulls the software update 50 after a potential installation time-window is identified.

Once the vehicle 102 is in a stationary state (block 532), the BPF tool 182 may monitor the state of the automotive OS 186 (block 534). In the illustrated example, the automotive OS 186 is initially in a busy state (block 536). For example, the automotive OS 186 may be busy performing tasks and other operations related to navigation, entertainment, climate control, etc. After the automotive OS 186 finishes performing the tasks, the automotive OS 186 may transition to an available state (block 538).

Then, the BPF tool 182 confirms that the automobile 102 and the automotive OS 186 meet the instillation criteria (e.g., stationary and the OS in the available state) (block 540). After confirming that both the installation criteria are met and that the automotive OS 186 is operating within the allowable operating metric ranges, the BPF tool 182 may inject the software update 50 as small pieces (e.g., 256 bytes of bytecode at a time) of BPF code 544 (block 546). Then, the automotive OS 186 is updated without affecting the automotive kernel (block 548). As noted above, the software update 50 may be safely applied without writing new kernel modules, which advantageously prevents the risks associated with writing and installing new kernel modules (e.g., system crashes or kernel panic).

By leveraging BPF technology through the BPF tool 182, the status of the automobile 102 and the automotive OS 186 may be observed, relevant measurements may be taken, and based on those observations and measurements, the BPF tool 182 may determine an optimum time-window for installing the software update 50. Additionally, the BPF tool 183 may facilitate installing the software update 50 as small pieces of BPF code, which may be safely installed while the automotive OS 186 is under lighter loads (e.g., not under a heavy load of a predetermined threshold) and also when the automobile or automotive OS 186 is not performing other critical operations. Thus, software updates 50 may be safely applied without writing new kernel modules, as with traditional techniques, which may place the automotive OS 186 at risk of crashing or entering kernel panic, which could be a safety issue for the driver or any passengers. Instead, the BPF tool 182 provides a mechanism to inject pieces of BPF code directly into the automotive OS 186. The BPF code may be run or executed by an interpreter, which may be integrated as part of the BPF tool 182, without affecting the kernel.

Figure 6:
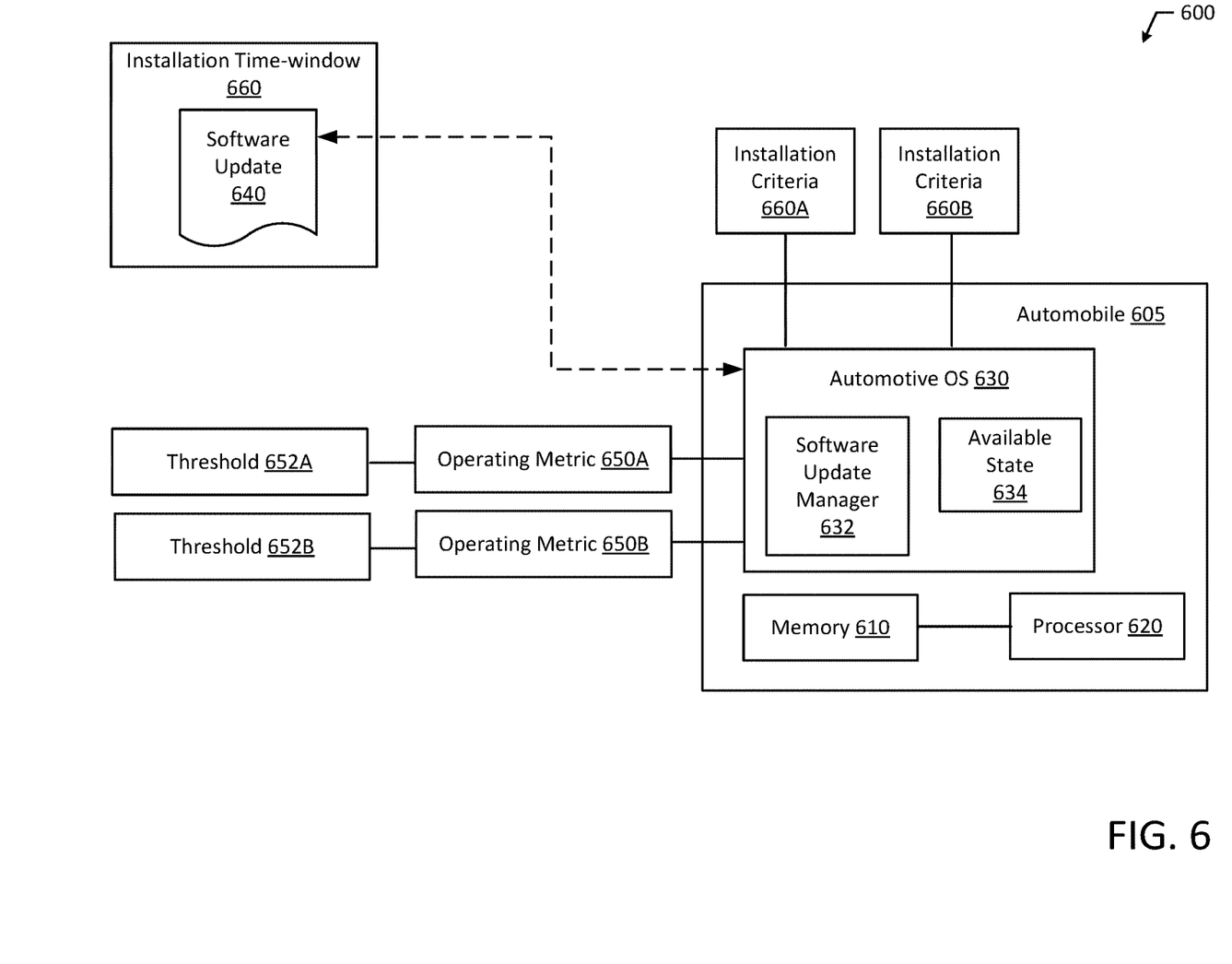
FIG. 6 illustrates a block diagram of an example automotive software update system according to an example embodiment of the present disclosure.

FIG. 6 is a block diagram of an example automotive software system 600 according to an example of the present disclosure. The system 600 includes a memory 610, a processor 620 in communication with the memory 610, and an automotive operating system (OS) 630 with a software update manager 632 for an automobile 605. At least one of the processor 620, the automotive OS 630 and the software update manager 632 may be configured to determine a new software update 640 is available, monitor operating metrics 650A-B of the automotive OS 630, and determine an installation time-window 660 when each of the operating metrics 650A-B collectively fall within respective predetermined thresholds 652A-B. Responsive to determining that each of the operating metrics 650A-B fall within the respective predetermined thresholds 652A-B, the processor 620, the automotive OS 630 and/or the software update manager 632 may be configured to signal to the software update manager 632 to start the installation once the automobile meets installation criteria 660A-B. The installation criteria 660A-B include at least (i) a first criteria 660A that the automobile 605 is stationary and (ii) a second criteria 660B that the automotive OS 630 is in an available state 634.

Figure 7:
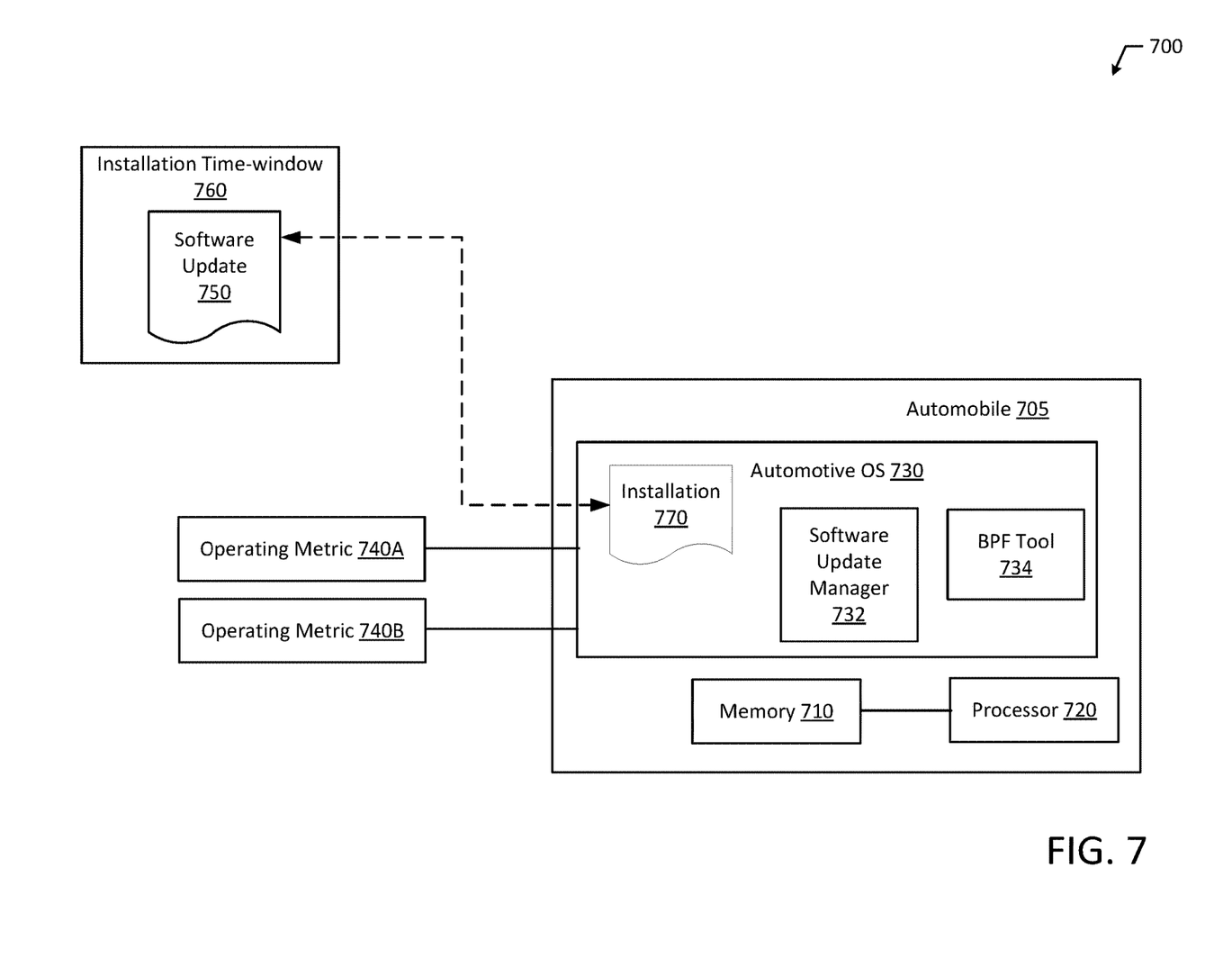
FIG. 7 illustrates a block diagram of an example automotive software update system according to an example embodiment of the present disclosure.

FIG. 7 is a block diagram of an example automotive software update system 700 according to an example of the present disclosure. The system 700 includes a memory 710, a processor 720 in communication with the memory 710, an automotive operating system (OS) 730 with a software update manager 732 for an automobile 705, and a Berkley Packet Filter (BPF) tool 734 associated with the automotive OS 730. The BPF tool 734 may be configured to monitor at least a first operating metric 740A and a second operating metric 740B of the automotive OS 730 responsive to receiving a new software update 750. The BPF tool 734 may also be configured to identify a potential installation time-window 760 for the new software update 750 based on at least the first operating metric 740A and the second operating metric 740B. Additionally the BPF tool 734 may be configured to initiate an installation 770 of the new software update 750 during the potential installation time-window 760.

The automotive software update systems 600, 700 advantageously leverage technology, such as BPF mechanisms and methods to determine optimal time-windows to install automotive software updates. By identifying optimal time-windows for installation, the updates may be installed in the automotive OS 186 without requiring the automobile 102 to be powered-off, but while ensuring safety and reducing the likelihood of the automotive OS 186 or kernel 180 from crashing. Furthermore, by identifying optimal time-windows for installation while the automobile 102 is still powered-on, small software updates may be provide over-the-air more often, such that the automobile 102 is more regularly updated to the lasted software version. For example, traditional approaches often require an automobile to be in a "maintenance" mode or while the vehicle 102 is fully powered off, but the techniques disclosed herein expand the possibility to apply software updates while the vehicle 102 is "online."

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system includes a memory, a processor in communication with the memory, and an automotive operating system (OS) with a software update manager for an automobile. At least one of the processor, the automotive OS and the software update manager is configured to determine a new software update is available, monitor operating metrics of the automotive OS, and determine an installation time-window when each of the operating metrics collectively fall within respective predetermined thresholds. Responsive to determining that each of the operating metrics fall within respective predetermined thresholds, the at least one of the processor, the automotive OS and the software update manager is configured to signal to the software update manager to start the installation once the automobile meets installation criteria. The installation criteria include at least (i) a first criteria that the automobile is stationary and (ii) a second criteria that the automotive OS is in an available state.

In a 2nd exemplary aspect of the present disclosure, which may be used in combination with any one or more of the preceding aspects (e.g., the 1st aspect), at least one of the processor, the automotive OS and the software update manager is further configured to perform the new software update during the installation time-window.

In a 3rd exemplary aspect of the present disclosure, which may be used in combination with any one or more of the preceding aspects (e.g., the 1st aspect), the automotive OS is associated with an operational state, the operational state being one of (1) an inactive state, (2) a busy state, and (3) the available state. The inactive state indicates that the automobile is powered down, the busy state indicates that the automotive OS is busy performing an update or other task thereby making the automotive OS unavailable for performing the new software update, and the available state indicates that the automotive OS has sufficient computational resources to perform the new software update.

In a 4th exemplary aspect of the present disclosure, which may be used in combination with any one or more of the preceding aspects (e.g., the 1st aspect), the system further includes a Berkeley Packet Filter (BPF) tool associated with at least one of the automotive OS and the software update manager. Additionally, the BPF tool is configured to inject BPF compatible code associated with the new software update.

In a 5th exemplary aspect of the present disclosure, which may be used in combination with any one or more of the preceding aspects (e.g., the 4th aspect), the system further includes an interpreter configured to execute, at least in part, the BPF compatible code that was injected by the BPF tool within the automotive OS.

In a 6th exemplary aspect of the present disclosure, which may be used in combination with any one or more of the preceding aspects (e.g., the 5th aspect), the BPF compatible code is adapted for safe execution within the automotive OS without altering any respective kernel modules associated with the automotive OS.

In a 7th exemplary aspect of the present disclosure, which may be used in combination with any one or more of the preceding aspects (e.g., the 1st aspect), the operating metrics include at least two operating metrics. The at least two operating metrics include at least two of an unclaimed CPU metric, a memory pressure metric, a memory leak metric, and a disk metric.

In an 8th exemplary aspect of the present disclosure, which may be used in combination with any one or more of the preceding aspects (e.g., the 7th aspect), the disk metric is one of a request time metric, an input/output operation per second (IOPS) metric, and a disk utilization metric.

Aspects of the subject matter described herein may be useful alone or in combination with one or more other aspects described herein. In a 9th exemplary aspect of the present disclosure, a method includes determining that a new software update is available for an automobile, monitoring operating metrics of an automotive OS of the automobile, and determining an installation time-window when each of the operating metrics collectively fall within respective predetermined thresholds. Responsive to determining that each of the operating metrics fall within respective predetermined thresholds, the method includes signaling to a software update manager of the automotive OS to start installing the new software update once the automobile meets installation criteria. The installation criteria include at least (i) a first criteria that the automobile is stationary and (ii) a second criteria that the automotive OS is in an available state.

In a 10th exemplary aspect of the present disclosure, which may be used in combination with any one or more of the preceding aspects (e.g., the 9th aspect), the method further includes performing the new software update during the installation time-window.

In an 11th exemplary aspect of the present disclosure, which may be used in combination with any one or more of the preceding aspects (e.g., the 9th aspect), the method further includes injecting, by a Berkeley Packet Filter (BPF) tool associated with at least one of the automotive OS and the software update manager, BPF compatible code associated with the new software update into the automotive OS.

In a 12th exemplary aspect of the present disclosure, which may be used in combination with any one or more of the preceding aspects (e.g., the 11th aspect), the method further includes executing, by an interpreter, the BPF compatible code that was injected by the BPF tool within the automotive OS.

In a 13th exemplary aspect of the present disclosure, which may be used in combination with any one or more of the preceding aspects (e.g., the 12th aspect), the BPF compatible code is adapted for safe execution within the automotive OS without altering any respective kernel modules associated with the automotive OS.

In a 14th exemplary aspect of the present disclosure, which may be used in combination with any one or more of the preceding aspects (e.g., the 9th aspect), the operating metrics include at least two operating metrics. The at least two operating metrics include at least two of an unclaimed CPU metric, a memory pressure metric, a memory leak metric, and a disk metric.

In a 15th exemplary aspect of the present disclosure, which may be used in combination with any one or more of the preceding aspects (e.g., the 14th aspect), the disk metric is one of a request time metric, an input/output operation per second (IOPS) metric, and a disk utilization metric.

Aspects of the subject matter described herein may be useful alone or in combination with one or more other aspects described herein. In a 16th exemplary aspect of the present disclosure, a system includes a first means for determining that a new software update is available for an automobile, a means for monitoring operating metrics of an automotive OS of the automobile, and a second means for determining an installation time-window when each of the operating metrics collectively fall within respective predetermined thresholds. The system also includes a means for signaling to a software update manager of the automotive OS to start installing the new software update once the automobile meets installation criteria and responsive to determining that each of the operating metrics fall within respective predetermined thresholds. The installation criteria include at least (i) a first criteria that the automobile is stationary and (ii) a second criteria that the automotive OS is in an available state.

Aspects of the subject matter described herein may be useful alone or in combination with one or more other aspects described herein. In a 17th exemplary aspect of the present disclosure, a non-transitory machine-readable medium stores code, which when executed by a processor is configured to determine that a new software update is available for an automobile, monitor operating metrics of an automotive OS of the automobile, and determine an installation time-window when each of the operating metrics collectively fall within respective predetermined thresholds. Responsive to determining that each of the operating metrics fall within respective predetermined thresholds, the non-transitory machine-readable medium is configured to signal to a software update manager of the automotive OS to start installing the new software update once the automobile meets installation criteria. The installation criteria include at least (i) a first criteria that the automobile is stationary and (ii) a second criteria that the automotive OS is in an available state.

Aspects of the subject matter described herein may be useful alone or in combination with one or more other aspects described herein. In an 18th exemplary aspect of the present disclosure, a system includes a memory, a processor in communication with the memory, an automotive operating system (OS) with a software update manager for an automobile, and a Berkley Packet Filter (BPF) tool associated with the automotive OS. The BPF tool is configured to responsive to receiving a new software update, monitor at least a first operating metric and a second operating metric of the automotive OS. The BPF tool is also configured to identify a potential installation time-window for the new software update based on at least the first operating metric and the second operating metric. Additionally the BPF tool is configured to initiate an installation of the new software update during the potential installation time-window.

In a 19th exemplary aspect of the present disclosure, which may be used in combination with any one or more of the preceding aspects (e.g., the 18th aspect), the BPF tool is further configured to perform the new software update during the installation time-window.

In a 20th exemplary aspect of the present disclosure, which may be used in combination with any one or more of the preceding aspects (e.g., the 18th aspect), the potential installation time-window is further based on an operational state of the automotive OS. The operational state is one of (i) an inactive state, (ii) a busy state, and (iii) the available state.

In a 21st exemplary aspect of the present disclosure, which may be used in combination with any one or more of the preceding aspects (e.g., the 20th aspect), the inactive state indicates that the automobile is powered down.

In a 22nd exemplary aspect of the present disclosure, which may be used in combination with any one or more of the preceding aspects (e.g., the 20th aspect), the busy state indicates that the automotive OS is busy performing an update or other task thereby making the automotive OS unavailable.

In a 23rd exemplary aspect of the present disclosure, which may be used in combination with any one or more of the preceding aspects (e.g., the 20th aspect), the available state indicates that the automotive OS has sufficient computational resources to perform the new software update.

In a 24th exemplary aspect of the present disclosure, which may be used in combination with any one or more of the preceding aspects (e.g., the 18th aspect), initiating the installation includes injecting BPF compatible code associated with the new software update into the automotive OS.

In a 25th exemplary aspect of the present disclosure, which may be used in combination with any one or more of the preceding aspects (e.g., the 24th aspect), the system further includes an interpreter configured to execute, at least in part, the BPF compatible code that was injected into the automotive OS.

In a 26th exemplary aspect of the present disclosure, which may be used in combination with any one or more of the preceding aspects (e.g., the 24th aspect), the BPF compatible code is adapted for safe execution within the automotive OS without altering any respective kernel modules associated with the automotive OS.

In a 27th exemplary aspect of the present disclosure, which may be used in combination with any one or more of the preceding aspects (e.g., the 18th aspect), the first operating metric and the second operating metric include two of an unclaimed CPU metric, a memory pressure metric, a memory leak metric, and a disk metric.

In a 28th exemplary aspect of the present disclosure, which may be used in combination with any one or more of the preceding aspects (e.g., the 27th aspect), the disk metric is one of a request time metric, an input/output operation per second (IOPS) metric, and a disk utilization metric.

Aspects of the subject matter described herein may be useful alone or in combination with one or more other aspects described herein. In a 29th exemplary aspect of the present disclosure, a method includes responsive to receiving a new software update, monitoring, by a BPF tool, at least a first operating metric and a second operating metric of an automotive OS. The method also includes identifying, by the BPF tool, a potential installation time-window for the new software update based on at least the first operating metric and the second operating metric. Additionally, the method includes initiating, by the BPF, an installation of the new software update during the potential installation time-window.

In a 30th exemplary aspect of the present disclosure, which may be used in combination with any one or more of the preceding aspects (e.g., the 29th aspect), the method further includes performing, by the BPF tool, the new software update during the installation time-window.

In a 31st exemplary aspect of the present disclosure, which may be used in combination with any one or more of the preceding aspects (e.g., the 29th aspect), the potential installation time-window is further based on an operational state of the automotive OS, the operational state being one of (i) an inactive state, (ii) a busy state, and (iii) the available state.

In a 32nd exemplary aspect of the present disclosure, which may be used in combination with any one or more of the preceding aspects (e.g., the 31st aspect), the inactive state indicates that the automobile is powered down.

In a 33rd exemplary aspect of the present disclosure, which may be used in combination with any one or more of the preceding aspects (e.g., the 31st aspect), the busy state indicates that the automotive OS is busy performing an update or other task thereby making the automotive OS unavailable.

In a 34th exemplary aspect of the present disclosure, which may be used in combination with any one or more of the preceding aspects (e.g., the 31st aspect), the available state indicates that the automotive OS has sufficient computational resources to perform the new software update.

In a 35th exemplary aspect of the present disclosure, which may be used in combination with any one or more of the preceding aspects (e.g., the 29th aspect), initiating the installation includes injecting BPF compatible code associated with the new software update into the automotive OS.

In a 36th exemplary aspect of the present disclosure, which may be used in combination with any one or more of the preceding aspects (e.g., the 29th aspect), the method further includes executing, by an interpreter the BPF compatible code that was injected into the automotive OS.

In a 37th exemplary aspect of the present disclosure, which may be used in combination with any one or more of the preceding aspects (e.g., the 36th aspect), the BPF compatible code is adapted for safe execution within the automotive OS without altering any respective kernel modules associated with the automotive OS.

In a 38th exemplary aspect of the present disclosure, which may be used in combination with any one or more of the preceding aspects (e.g., the 29th aspect), the first operating metric and the second operating metric include two of an unclaimed CPU metric, a memory pressure metric, a memory leak metric, and a disk metric.

In a 39th exemplary aspect of the present disclosure, which may be used in combination with any one or more of the preceding aspects (e.g., the 38th aspect), the disk metric is one of a request time metric, an input/output operation per second (IOPS) metric, and a disk utilization metric.

Aspects of the subject matter described herein may be useful alone or in combination with one or more other aspects described herein. In a 40th exemplary aspect of the present disclosure, a system includes a means for monitoring at least a first operating metric and a second operating metric of an automotive OS responsive to receiving a new software update. The system also includes a means for identifying a potential installation time-window for the new software update based on at least the first operating metric and the second operating metric. Additionally, the system includes a means for initiating an installation of the new software update during the potential installation time-window.

Aspects of the subject matter described herein may be useful alone or in combination with one or more other aspects described herein. In a 41st exemplary aspect of the present disclosure, a non-transitory machine-readable medium stores code, which when executed by a processor is configured to monitor at least a first operating metric and a second operating metric of an automotive OS responsive to receiving a new software update. Additionally, the non-transitory machine-readable medium is configured to identify a potential installation time-window for the new software update based on at least the first operating metric and the second operating metric. The non-transitory machine-readable medium is also configured to initiate an installation of the new software update during the potential installation time-window.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory;
a processor in communication with the memory; and
an automotive operating system (OS) with a software update manager for an automobile, wherein at least one of the processor, the automotive OS and the software update manager is configured to:
determine a new software update is available,
monitor operating metrics of the automotive OS,
determine an installation time-window when each of the operating metrics collectively fall within respective predetermined thresholds,
responsive to determining that each of the operating metrics fall within respective predetermined thresholds, signal to the software update manager to start the installation once the automobile meets installation criteria, wherein the installation criteria include at least a first criteria that the automobile is stationary and a second criteria that the automotive OS is in an available state,
wherein a Berkeley Packet Filter (BPF) tool is associated with at least one of the automotive OS or the software update manager, and the BPF tool is configured to inject BPF compatible code associated with the new software update.

2. The system of claim 1, wherein at least one of the processor, the automotive OS or the software update manager is further configured to perform the new software update during the installation time-window.

3. The system of claim 1, wherein the automotive OS is associated with an operational state, the operational state being one of an inactive state, a busy state, or the available state, wherein
the inactive state indicates that the automobile is powered down,
the busy state indicates that the automotive OS is busy performing an update or other task thereby making the automotive OS unavailable for performing the new software update, and
the available state indicates that the automotive OS has sufficient computational resources to perform the new software update.

4. The system of claim 1, further comprising an interpreter configured to execute, at least in part, the BPF compatible code that was injected by the BPF tool within the automotive OS.

5. The system of claim 4, wherein the BPF compatible code is adapted for safe execution within the automotive OS without altering any respective kernel modules associated with the automotive OS.

6. The system of claim 1, wherein the operating metrics includes at least two operating metrics, and wherein the at least two operating metrics include at least two of an unclaimed CPU metric, a memory pressure metric, a memory leak metric, or a disk metric.

7. The system of claim 6, wherein the disk metric is one of a request time metric, an input/output operation per second (IOPS) metric, or a disk utilization metric.

8. A method comprising:
determining that a new software update is available for an automobile;
monitoring operating metrics of an automotive OS of the automobile;
determining an installation time-window when each of the operating metrics collectively fall within respective predetermined thresholds; and
responsive to determining that each of the operating metrics fall within respective predetermined thresholds, signaling to a software update manager of the automotive OS to start installing the new software update once the automobile meets installation criteria, wherein the installation criteria include at least a first criteria that the automobile is stationary and a second criteria that the automotive OS is in an available state,
injecting, by a Berkeley Packet Filter (BPF) tool associated with at least one of the automotive OS or the software update manager, BPF compatible code associated with the new software update into the automotive OS.

9. The method of claim 8, further comprising performing the new software update during the installation time-window.

10. The method of claim 8, further comprising executing, by an interpreter, the BPF compatible code that was injected by the BPF tool within the automotive OS.

11. The method of claim 10, wherein the BPF compatible code is adapted for safe execution within the automotive OS without altering any respective kernel modules associated with the automotive OS.

12. The method of claim 8, wherein the operating metrics includes at least two operating metrics, and wherein the at least two operating metrics include at least two of an unclaimed CPU metric, a memory pressure metric, a memory leak metric, or a disk metric.

13. The method of claim 12, wherein the disk metric is one of a request time metric, an input/output operation per second (IOPS) metric, or a disk utilization metric.

14. A system comprising:
a memory;
a processor in communication with the memory;
an automotive operating system (OS) with a software update manager for an automobile; and
a Berkley Packet Filter (BPF) tool associated with the automotive OS, wherein the BPF tool is configured to:
responsive to receiving a new software update, monitor at least a first operating metric and a second operating metric of the automotive OS,
identify a potential installation time-window for the new software update based on at least the first operating metric and the second operating metric, and
initiate an installation of the new software update during the potential installation time-window, wherein initiating the installation includes injecting BPF compatible code associated with the new software update into the automotive OS, the system further comprising an interpreter configured to execute, at least in part, the BPF compatible code that was injected into the automotive OS.

15. The system of claim 14, wherein the BPF tool is further configured to perform the new software update during the installation time-window.

16. The system of claim 14, wherein the potential installation time-window is further based on an operational state of the automotive OS, the operational state being one of an inactive state, a busy state, or an available state.

17. The system of claim 16, wherein the inactive state indicates that the automobile is powered down, wherein the busy state indicates that the automotive OS is busy performing an update or other task thereby making the automotive OS unavailable, and wherein the available state indicates that the automotive OS has sufficient computational resources to perform the new software update.

* * * * *